US009099698B2

(12) United States Patent
Itoga

(10) Patent No.: US 9,099,698 B2
(45) Date of Patent: Aug. 4, 2015

(54) FUEL CELL SYSTEM HAVING A WATER FLOW DISRUPTION PORTION

(75) Inventor: Michitaro Itoga, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 535 days.

(21) Appl. No.: 12/905,190

(22) Filed: Oct. 15, 2010

(65) Prior Publication Data

US 2011/0091782 A1 Apr. 21, 2011

(30) Foreign Application Priority Data

Oct. 19, 2009 (JP) .................. 2009-240037

(51) Int. Cl.
*H01M 8/06* (2006.01)
*H01M 8/04* (2006.01)

(52) U.S. Cl.
CPC ............ *H01M 8/04164* (2013.01); *Y02E 60/50* (2013.01)

(58) Field of Classification Search
CPC ................ H01M 8/04164; Y02E 60/50
USPC ........................................ 429/414
See application file for complete search history.

(56) References Cited

U.S. PATENT DOCUMENTS

| | | | | |
|---|---|---|---|---|
| 3,955,948 A | * | 5/1976 | Campolong | 55/394 |
| 5,366,818 A | * | 11/1994 | Wilkinson et al. | 429/414 |
| 6,280,867 B1 | * | 8/2001 | Elias | 429/423 |
| 2007/0259241 A1 | * | 11/2007 | Miyamoto et al. | 429/34 |
| 2009/0023019 A1 | * | 1/2009 | Koenekamp et al. | 429/13 |

FOREIGN PATENT DOCUMENTS

| | | |
|---|---|---|
| JP | 8-329970 | 12/1996 |
| JP | 2005-50554 | 2/2005 |
| JP | 2006-339078 | 12/2006 |
| JP | 2008-66087 | 3/2008 |
| JP | 2008-103263 | 5/2008 |
| JP | 2008-241008 | 10/2008 |
| JP | 2008-262867 | 10/2008 |
| JP | 2008262867 A * | 10/2008 |
| JP | 2009-9762 | 1/2009 |
| JP | 2011-086565 | 4/2011 |
| JP | 2011086565 A * | 4/2011 |

* cited by examiner

*Primary Examiner* — Gary Harris
(74) *Attorney, Agent, or Firm* — Finnegan, Henderson, Farabow, Garrett & Dunner, LLP

(57) ABSTRACT

A fuel cell system includes a fuel cell stack that generates electricity by an electrochemical reaction using a fuel gas; an insulating first passage member through which produced water that is produced by the electrochemical reaction in the fuel cell stack and off-gas that is discharged from the fuel cell stack pass; a conductive second passage member that is connected to the first passage member; and a produced water flow disrupting portion that is provided on the first passage member and breaks up or stops the flow of the produced water that is introduced from an inside wall of the first passage member to the second passage member.

4 Claims, 11 Drawing Sheets

FUEL CELL SYSTEM HAVING A WATER FLOW DISRUPTION PORTION

INCORPORATION BY REFERENCE

The disclosure of Japanese Patent Application No. 2009-240037 filed on Oct. 19, 2010, including the specification, drawings and abstract is incorporated herein by reference in its entirety.

BACKGROUND OF THE INVENTION

1. Field of the Invention

The invention relates to a fuel cell system.

2. Description of the Related Art

In recent years, vehicles provided with fuel cell systems have continued to be put into practical use. A fuel cell system typically has, in addition to a fuel cell stack that generates electricity by an electrochemical reaction between hydrogen and oxygen, a gas-liquid separating device that separates hydrogen off-gas discharged from the fuel cell stack from water produced by the electrochemical reaction in the fuel cell stack, and a circulating pump for supplying the hydrogen off-gas that has been separated from the water to the fuel cell stack again, and the like.

The circulating pump in the fuel cell system is often made of metal, while the gas-liquid separating device is often made of resin or the like to reduce weight. Japanese Patent Application Publication No. 2008-66087 (JP-A-2008-66087), for example, describes technology related to a gas-liquid separating device in a fuel cell system.

In many fuel cell systems, the fuel cell stack is connected to an insulating gas-liquid separating device, and a member that forms a passage of the circulating pump is connected to the downstream side of a member that forms a passage of the gas-liquid separating device. This conductive circulating pump may be connected to a ground such as a frame of a vehicle.

In such a fuel cell system, if electrical conduction is established between a high voltage portion of the fuel cell stack (such as a flow passage inside a separator that forms part of the fuel cell stack) and the circulating pump via water that has been produced, the fuel cell stack will short.

Incidentally, this kind of problem is not limited to a gas-liquid separating device of a fuel cell system and a circulating pump that is connected to the gas-liquid separating device. The same problem typically exists when there is an insulating passage member through which produced water and off-gas pass, and a conductive passage member that is connected to that passage member.

SUMMARY OF INVENTION

The invention provides technology that is able to inhibit a fuel cell stack of a fuel cell system from electrically shorting.

A first aspect of the invention relates to a fuel cell system that includes a fuel cell stack that generates electricity by an electrochemical reaction using a fuel gas; an insulating first passage member through which produced water that is produced by the electrochemical reaction in the fuel cell stack and off-gas that is discharged from the fuel cell stack pass; a conductive second passage member that is connected to the first passage member; and a produced water flow disrupting portion that is provided on the first passage member and breaks up or stops the flow of the produced water that is introduced from an inside wall of the first passage member to the second passage member.

According to this fuel cell system, the flow of the produced water is able to be broken up or stopped by the produced water flow disrupting portion, so the fuel cell stack is able to be inhibited from electrically shorting via the produced water.

The produced water flow disrupting portion may be a protruding portion having a shape that protrudes from the inside wall of the first passage member.

According to this structure, the flow of the produced water is able to be broken up or stopped by the protruding portion, so the fuel cell stack is able to be inhibited from electrically shorting via the produced water.

A wall surface portion having a flat surface that is substantially perpendicular to a flow direction when the off-gas flows from the first passage member toward the second passage member may be formed on the upstream side, in the flow direction, of the protruding portion.

According to this structure, the flow of the produced water can be effectively broken up or stopped by the wall surface portion of the protruding portion, so the fuel cell stack is able to be inhibited from electrically shorting via the produced water.

An inclined portion that is inclined with respect to the inside wall of the first passage member may be formed on a downstream side, in a flow direction when the off-gas flows from the first passage member toward the second passage member, of the protruding portion, and the angle formed between the inclined portion and the inside wall may exceed 90°.

According to this structure, even if the produced water flows back toward the first passage member from the second passage member, it is possible to inhibit the produced water from pooling on the portion of the protruding portion that is on the downstream side in the flow direction.

The protruding portion may be provided on the inside wall of the first passage member at an outside portion of a curve that a flow direction when the off-gas flows from the first passage member toward the second passage member follows.

The produced water tends to flow along the passage member at the outside portion of the curve that the flow direction follows. Therefore, the flow of the produced water is able to be effectively broken up or stopped by the protruding portion.

The produced water flow disrupting portion may be a mesh member that has a mesh structure and is arranged in a passageway of the first passage member.

According to this structure, the flow of the produced water is able to be broken up or stopped by the mesh member, so the fuel cell stack can be inhibited from electrically shorting via the produced water.

A portion of the mesh member that is located near the center of the first passage member may be formed in a protruding shape in a flow direction when the off-gas flows from the first passage member toward the second passage member.

According to this structure, the produced water, the flow of which has been broken up or stopped by the mesh portion, is introduced from the protruding portion near the center of the mesh member to the side on which the second passage member is located, which makes it possible to inhibit the produced water that has become water droplets from adhering at the location where the first passage member and the second passage member are connected together.

The off-gas may be hydrogen off-gas discharged from the fuel cell stack, and the first passage member may be a member that is included in a gas-liquid separating device that separates the hydrogen off-gas from the produced water.

The second passage member may be a member that is included in a pump that draws up the hydrogen off-gas from the gas-liquid separating device.

Incidentally, the invention may be realized by various modes. For example, the invention may be realized by a mode such as a method for inhibiting a short in a fuel cell system.

BRIEF DESCRIPTION OF DRAWINGS

The foregoing and further objects, features and advantages of the invention will become apparent from the following description of exemplary embodiments with reference to the accompanying drawings, wherein like numerals are used to represent like elements and wherein.

DETAILED DESCRIPTION OF EMBODIMENTS

A. First Example Embodiment

Figure 1:
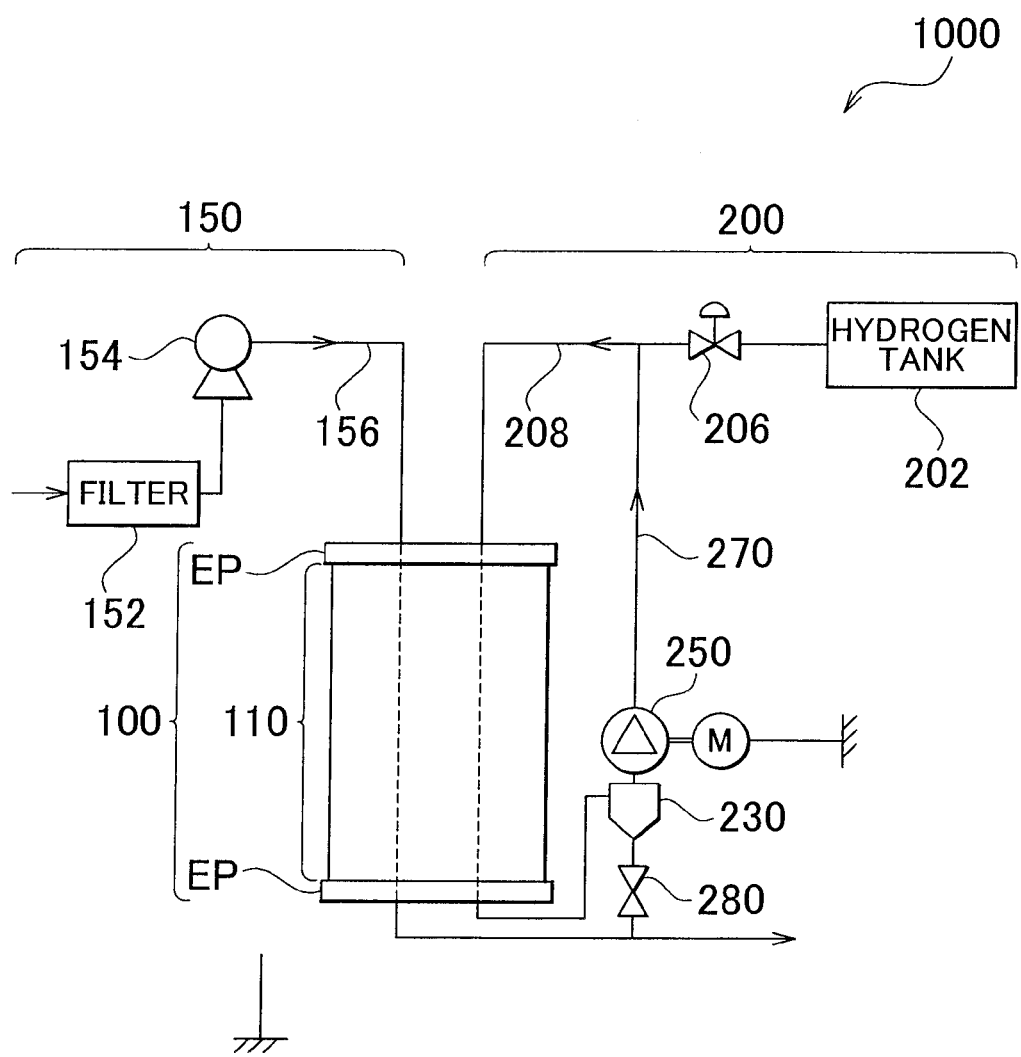
FIG. 1 is a view schematically showing the structure of a fuel cell system as a first example embodiment of the invention.

FIG. 1 is a view schematically showing the structure of a fuel cell system as a first example embodiment of the invention. The fuel cell system 1000 is a system that generates electricity using an electrochemical reaction between hydrogen and oxygen, and includes a fuel cell stack 100, an air supply system 150, and a fuel supply system 200. Incidentally, in this example embodiment, the fuel cell system 1000 for a fuel cell vehicle is used as an example, but the invention may also be applied to another fuel cell system such as a fixed fuel cell system.

The fuel cell stack 100 is formed by a stacked body 110 formed by a plurality of cells, not shown, that are stacked together, and two end plates EP that sandwich the stacked body 110. Each of the cells is formed by a separator, a fuel electrode (hereinafter referred to as an "anode"), an electrolyte membrane, an air electrode (hereinafter referred to as a "cathode"), and another separator stacked together in that order. Each of the cells generates electricity by an electrochemical reaction between oxygen in the air and hydrogen supplied via grooves in the separators, for example. Incidentally, in this example embodiment, a polymer electrolyte fuel cell is used.

The air supply system 150 is a system for supplying air to the fuel cell stack 100, and includes a filter 152, a compressor 154, and an air supply passage 156 that connects these devices together. Air drawn in from the outside through the filter 152 is compressed by the compressor 154 and supplied to the cathode of each of the plurality of cells that form the fuel cell stack 100. Incidentally, air that passes through the fuel cell stack 100 is discharged from the fuel cell stack 100.

The fuel supply system 200 is a system for supplying hydrogen gas as the fuel gas to the fuel cell stack 100, and includes a hydrogen tank 202, a pressure reduction valve 206, and a fuel supply passage 208 that connects these devices together. Hydrogen gas stored in the hydrogen tank 202 first passes through the pressure reduction valve 206 that reduces the pressure of the hydrogen gas to a predetermined pressure. The hydrogen gas that has been reduced in pressure is then supplied to the anode of each of the plurality of cells that form the fuel cell stack 100.

The fuel supply system 200 also includes a gas-liquid separating device 230, a hydrogen circulating pump 250, a circulating passage 270, and a purge valve 280, to supply the hydrogen gas that has passed through and been discharged from the fuel cell stack 100 (hereinafter, this gas may also referred to as "hydrogen off-gas") to the fuel cell stack 100 again.

The gas-liquid separating device 230 separates the hydrogen off-gas from the water that is produced by the electrochemical reaction in the fuel cell stack 100. The hydrogen off-gas that has been separated from the produced water by the gas-liquid separating device 230 is introduced into the circulating passage 270 by the hydrogen circulating pump 250 and then supplied to the fuel cell stack 100 again. Meanwhile, the produced water that has been separated from the hydrogen off-gas by the gas-liquid separating device 230 is discharged outside via the purge valve 280. Incidentally, the hydrogen circulating pump 250 is normally made of conductive material such as a metal (stainless steel in this example embodiment).

Figure 2:
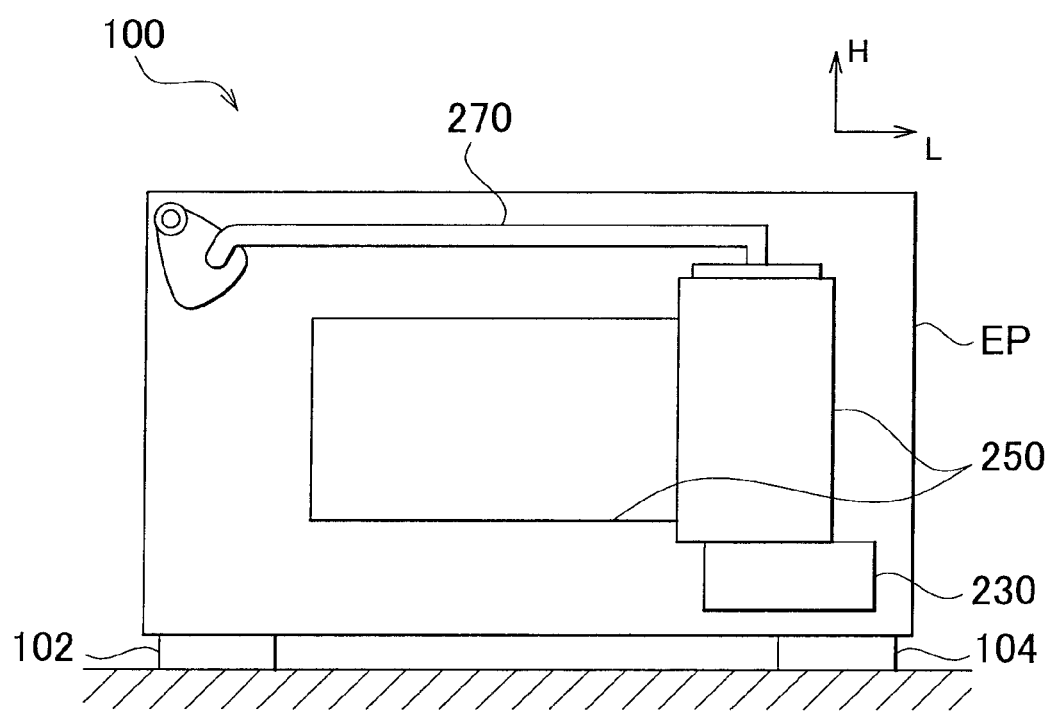
FIG. 2 is a view showing a frame format of a fuel cell stack and peripheral devices that are connected to the fuel cell stack.

FIG. 2 is a view showing a frame format of the fuel cell stack 100 and the peripheral devices that are connected to the fuel cell stack 100. Incidentally, in FIG. 2, the horizontal direction when the fuel cell is mounted is indicated by arrow L, and the vertical direction when the fuel cell is mounted is indicated by arrow H. This is also true in the drawings that will be described hereinafter. The fuel cell stack 100 is supported by support members 102 and 104. The gas-liquid separating device 230 and the hydrogen circulating pump 250 are arranged on an end plate EP side of the fuel cell stack 100. The circulating passage 270 that is connected to the hydrogen circulating pump 250 is connected to the end plate EP. The hydrogen off-gas that has passed through the gas-liquid separating device 230 is supplied to the fuel cell stack 100 again by the hydrogen circulating pump 250.

Figure 3A:
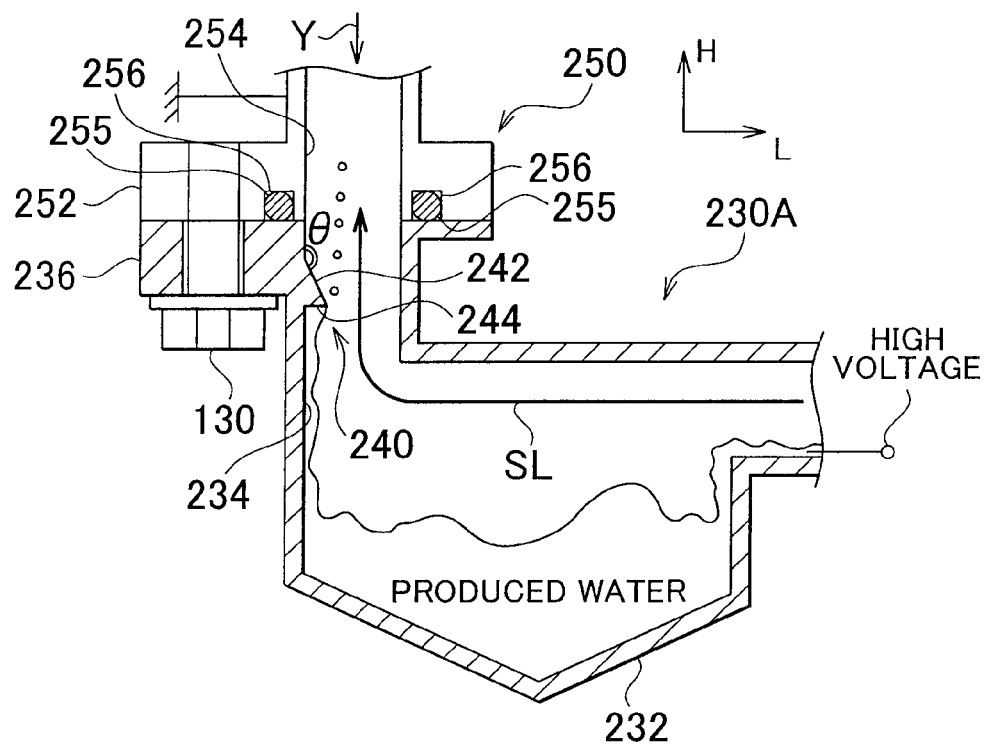
FIG. 3A is an enlarged view of the location where a gas-liquid separating device and a hydrogen circulating pump are connected together.
Figure 3B:
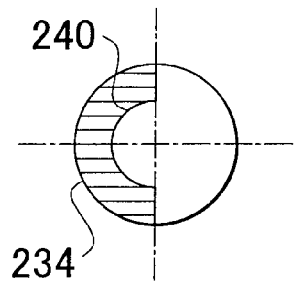
FIG. 3B is a view of the inside of the gas-liquid separating device as viewed from the direction of arrow Y in FIG. 3A.

FIG. 3A is an enlarged view of the location where the gas-liquid separating device 230 and the hydrogen circulating pump 250 are connected together. FIG. 3B is a view of the inside of the gas-liquid separating device 230 as viewed from the direction of arrow Y in FIG. 3A. A produced water storage portion 232 that stores the produced water that has been separated from the hydrogen off-gas, a cylindrical passage portion 234 that extends substantially vertically and through which the hydrogen off-gas that has been separated from the produced water passes, and a flange portion 236 for connecting with the hydrogen circulating pump 250, are shown as part of the gas-liquid separating device 230 in FIG. 3A. This gas-liquid separating device 230 is made of insulating material such as resin (nylon resin in this example embodiment).

Furthermore, a flange portion 252 for connecting with the flange portion 236 of the gas-liquid separating device 230, and a cylindrical passage portion 254 that extends substantially vertically and through which the hydrogen off-gas water passes, are shown as part of the hydrogen circulating pump 250 in FIG. 3A.

The flange portion 236 of the gas-liquid separating device 230 is connected to the flange portion 252 of the hydrogen circulating pump 250 by a mounting bolt 130. An annular groove portion 256 is formed in the flange portion 252 of the hydrogen circulating pump 250, and an annular seal member 255 is arranged in this groove portion 256. This seal member 255 is a so-called O-ring that ensures an airtight seal between the passage portion 234 of the gas-liquid separating device 230 and the passage portion 254 of the hydrogen circulating pump 250. The seal member 255 is made of material that is gas impermeable, elastic, and heat resistant, e.g., elastic material such as rubber. More specifically, ethylene-propylene rubber, silicon rubber, butyl rubber, acrylic rubber, natural rubber, fluoro-rubber, a styrene elastomer, or a fluorinated elastomer or the like may be used. In this example embodiment, the seal member 255 is made of ethylene-propylene rubber.

The hydrogen off-gas that has been separated from the produced water passes through the upper portion of the produced water storage portion 232 in response to the sucking action of the hydrogen circulating pump 250, after which it is introduced substantially vertically through the passage portion 234 and the passage portion 254. Arrow SL in FIG. 3A indicates the flow direction of this hydrogen off-gas.

In this example embodiment, a protruding portion 240 is formed on an inner wall of the passage portion 234 of the gas-liquid separating device 230, and is shaped protruding outward from the inner wall. This protruding portion 240 breaks up or stops the flow of the produced water that runs up the wall surface of the passage portion 234 from the sucking action of the hydrogen circulating pump 250. That is, the produced water that is stored in the produced water storage portion 232 runs up the wall surface of the passage portion 234 from the sucking action of the hydrogen circulating pump 250, but is inhibited from reaching, in a continuous flow, the portion where the passage portion 234 of the gas-liquid separating device 230 is connected to the passage portion 254 of the hydrogen circulating pump 250 (i.e., the flow of the water running up the wall surface of the passage portion 234 is broken up or stopped before it reaches the portion where passage portion 234 of the gas-liquid separating device 230 is connected to the passage portion 254 of the hydrogen circulating pump 250). As a result, this example embodiment makes it possible to inhibit electrical conduction from being established between the fuel cell stack 100 and the hydrogen circulating pump 250 via the produced water.

Moreover, the hydrogen circulating pump 250 that is made of conductive material is connected either directly or via another member to a ground (such as the frame of a vehicle). In this case as well, the protruding portion 240 is formed on the inside wall of the passage portion 234, so it is possible to inhibit the fuel cell stack 100 from electrically shorting via the produced water.

As in this example embodiment, a wall surface portion 244 that has a flat surface that is substantially perpendicular to the flow direction SL is preferably formed on the upstream side, in the flow direction SL, (i.e., on the vertically lower side) of the protruding portion 240. The flow of the produced water in the flow direction SL is effectively broken up or stopped by the wall surface portion 244 of the protruding portion 240. Therefore, by forming the wall surface portion 244 on the protruding portion 240, it is possible to effectively inhibit the fuel cell stack 100 from electrically shorting via the produced water.

Also, as in this example embodiment, an inclined portion 242 that is inclined with respect to the inside wall of the passage portion 234 is preferably formed on the downstream side, in the flow direction SL, (i.e., on the vertically upper side) of the protruding portion 240. The angle θ formed between this inclined portion 242 and the inside wall of the passage portion 234 is preferably set to a value greater than 90° (=π/2). In this example embodiment, the angle θ is set to 160°.

As in this example embodiment, forming the inclined portion 242 on the protruding portion 240 enables the produced water to flow vertically downward over the inclined portion 242 without it pooling on the upper portion of the protruding portion 240 if the hydrogen circulating pump 250 stops and the produced water flows vertically downward (i.e., flows backward) as a result. If produced water pools and freezes on the upper portion of the protruding portion 240, and then that frozen produced water is drawn into the hydrogen circulating pump 250, it may cause the hydrogen circulating pump 250 to fail. Forming the inclined portion 242 on the protruding portion 240 inhibits produced water from pooling on the upper portion of the protruding portion 240, so this kind of problem can be avoided. Even if produced water does pool on the upper portion of the protruding portion 240, the amount is miniscule, so it will not cause problems with the hydrogen circulating pump 250.

Also, as in this example embodiment, the protruding portion 240 is preferably provided on the inside wall of the passage portion 234 at the outside portion of the curve that the flow direction SL follows. The reason for this will now be described. The produced water that is drawn up by the hydrogen circulating pump 250 often runs up the inside wall of the passage portion 234 at the outside portion of the curve that the flow direction SL follows. Therefore, providing the protruding portion 240 on the inside wall of the passage portion 234 at the outside portion of the curve that the flow direction SL follows enables the fuel cell stack 100 to be effectively inhibited from electrically shorting via the produced water. Alternatively, however, the protruding portion 240 may also be formed on the inside wall of the passage portion 234 at the inside portion of the curve that the flow direction SL follows, or may be formed all the way around the inside wall of the passage portion 234 in the radial direction. These structures also make it possible to inhibit the fuel cell stack 100 from electrically shorting.

Figure 4:
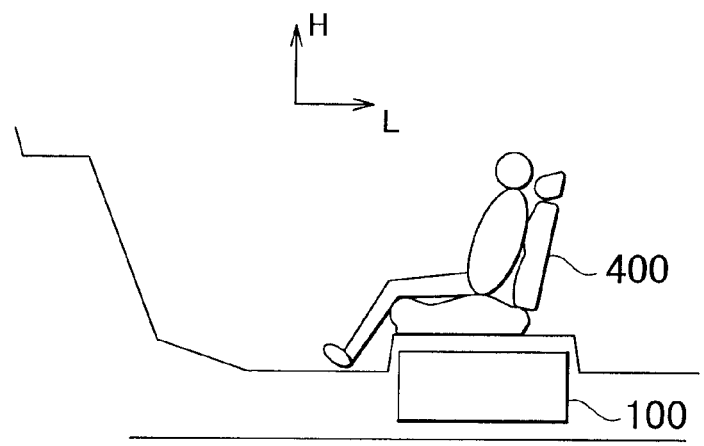
FIG. 4 is a view of an example of a layout when the fuel cell stack is mounted in a vehicle.

FIG. 4 is a view of an example of a layout when the fuel cell stack 100 is mounted in a vehicle. As shown in FIG. 4, the fuel cell stack 100 may be arranged in an underfloor portion under a seat 400 in the vehicle, for example. Alternatively, however, the 100 may be arranged under the hood of the vehicle or in an underfloor portion that is somewhere else other than under a seat.

Incidentally, in this first example embodiment, the fuel cell stack 100 can be inhibited from electrically shorting via the produced water by forming the protruding portion 240, so the lengths of the passage portion 234 and the passage portion 254 can be made shorter. Therefore, the fuel cell system 1000 can be made smaller and lighter.

B. Second Example Embodiment

Figure 5:
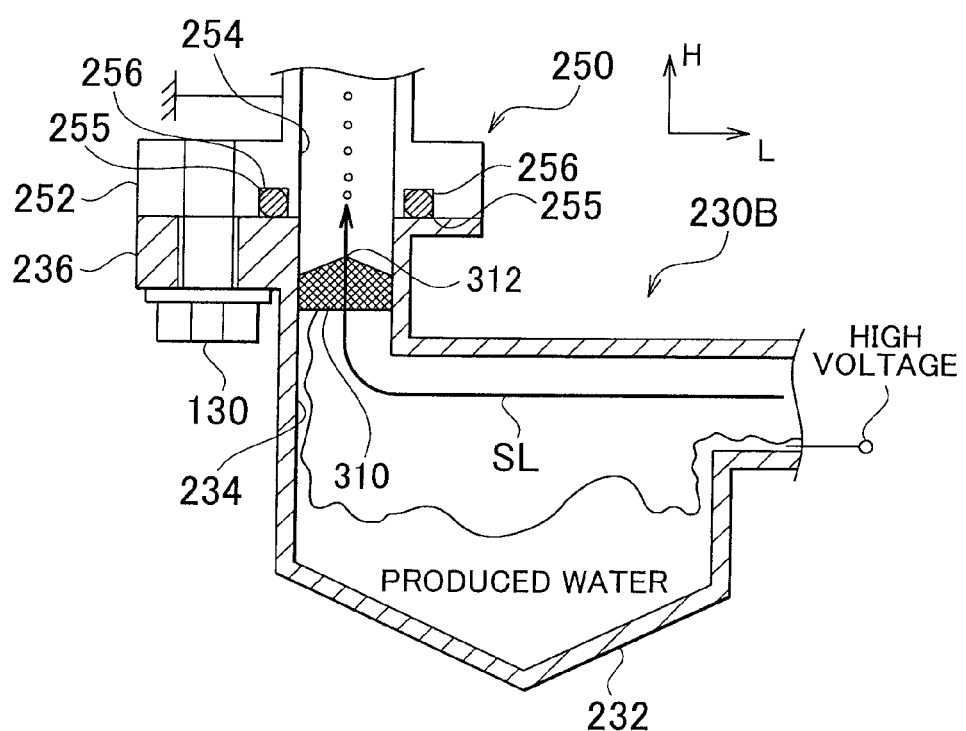
FIG. 5 is an enlarged view of the location where a gas-liquid separating device and a hydrogen circulating pump are connected together according to a second example embodiment of the invention.

FIG. 5 is an enlarged view of the location where a gas-liquid separating device 230B and the hydrogen circulating pump 250 are connected together according to a second example embodiment of the invention. The only difference between the second example embodiment and the first example embodiment shown in FIG. 3A is that a mesh member 310 is arranged in the passageway of the passage portion 234, instead of having the protruding portion 240 formed on the passage portion 234 of the gas-liquid separating device 230B. Other than this, the structure is the same as it is in the first example embodiment. Incidentally, in this example embodiment, the mesh member 310 is fixed to the inside wall of the passage portion 234 by welding, but it may also be fixed to the passage portion 234 by fitting together with the passage portion 234.

The mesh member 310 has a mesh structure and may be made of resin such as nylon, or rubber or the like. The mesh structure of the mesh member 310 enables it to trap produced water drawn up by the sucking action of the hydrogen circulating pump 250 and produced water that runs vertically up the wall surface of the passage portion 234. The flow of produced water that is trapped by the mesh member 310 is broken up into water droplets, so the fuel cell stack 100 can be inhibited from electrically shorting via the produced water.

Moreover, a protruding portion 312 that protrudes in the flow direction SL is preferably formed on a portion of the mesh member 310 that is located near the center of the passage portion 234. This way, the produced water in the form of water droplets is drawn to the hydrogen circulating pump 250 side from the protruding portion 312 in the center of the mesh member 310, so it will not easily adhere to the wall surface of the passage portion 234 on the upstream side of the mesh member 310, or to the wall surface of the passage portion 254. Therefore, it is possible to inhibit electrical conduction from being established between the fuel cell stack 100 and the hydrogen circulating pump 250 via the produced water, so the fuel cell stack 100 can be inhibited from electrically shorting via the produced water.

Also, the mesh member 310 also functions to reduce the flowrate of the hydrogen off-gas due to pressure loss, and is thus effective in reducing the amount of produced water that is drawn up from the produced water storage portion 232, as well as inhibiting the surface of the produced water stored in the produced water storage portion 232 from tilting in the flow direction SL.

In this way, if the mesh member 310 is arranged in the passageway of the passage portion 234 of the gas-liquid separating device 230B, the fuel cell stack 100 can be inhibited from electrically shorting via the produced water, just as in the first example embodiment.

C. Modified Examples

Incidentally, the invention is not limited to the example embodiments described above. That is, the invention may be carried out in any one of various modes. For example, modifications such as those described below are also possible.

C1. Modified Examples of the First Example Embodiment

Modified examples of the first example embodiment will now be described. The only difference between these modified examples and the first example embodiment shown in FIGS. 3A and 3B is that the shape of the protruding portion 240 formed on the passage portion 234 is different. Other than this, the structure is the same as it is in the first example embodiment.

Figure 6A:
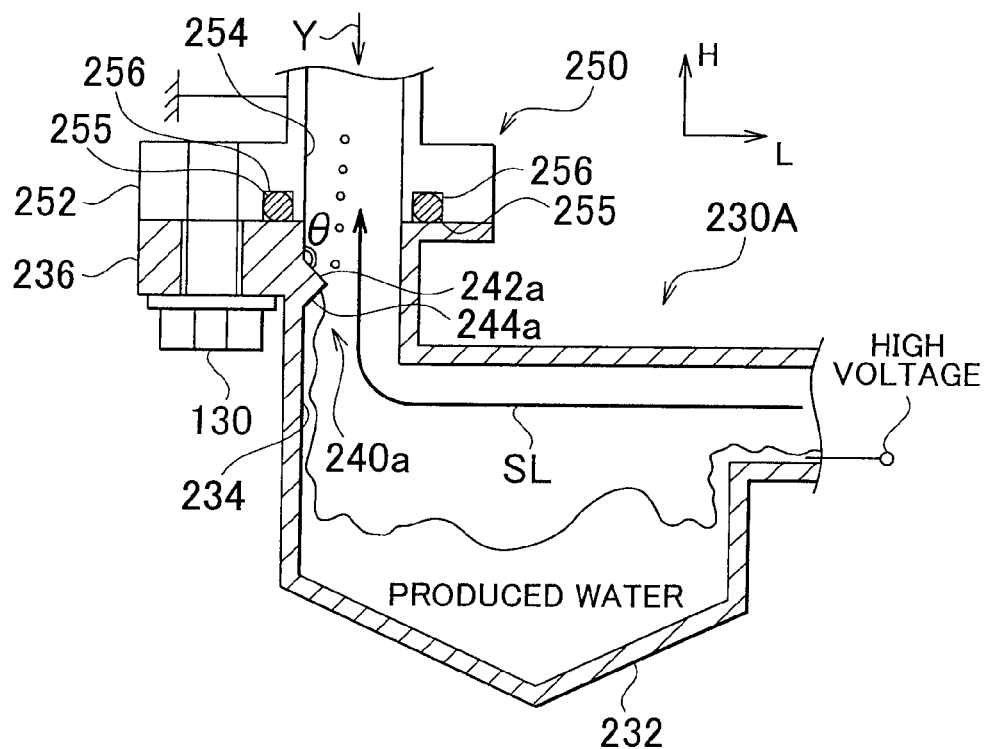
FIGS. 6A and 6B are views of a protruding portion according to a first modified example of the first example embodiment.
Figure 6B:
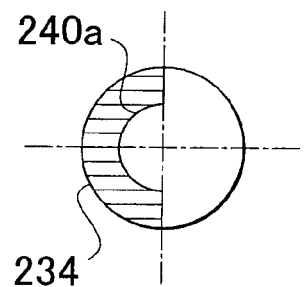

FIGS. 6A and 6B are views of a protruding portion 240a according to a first modified example of the first example embodiment. As shown in FIGS. 6A and 6B, a wall surface portion 244a formed on the vertically lower side of the protruding portion 240a may be formed inclined with respect to the flow direction SL, and the angle formed between the wall surface portion 244a and the passage portion 234 may be an obtuse angle.

Figure 7A:
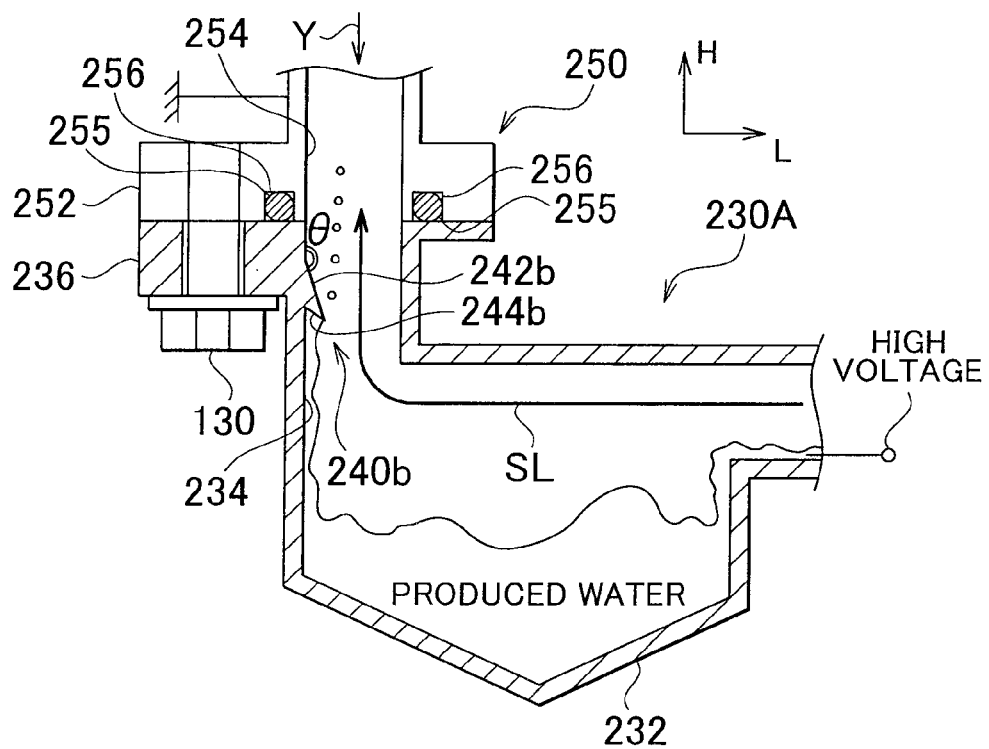
FIGS. 7A and 7B are views of a protruding portion according to a second modified example of the first example embodiment.
Figure 7B:
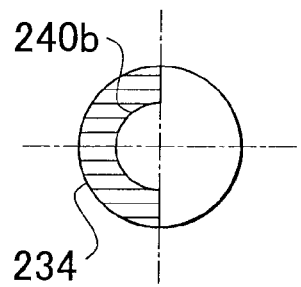

FIGS. 7A and 7B are views of a protruding portion 240b according to a second modified example of the first example embodiment. As shown in FIGS. 7A and 7B, a wall surface portion 244b formed on the vertically lower side of the protruding portion 240b may be formed inclined with respect to the flow direction SL, and the angle formed between the wall surface portion 244b and the passage portion 234 may be an acute angle.

Figure 8A:
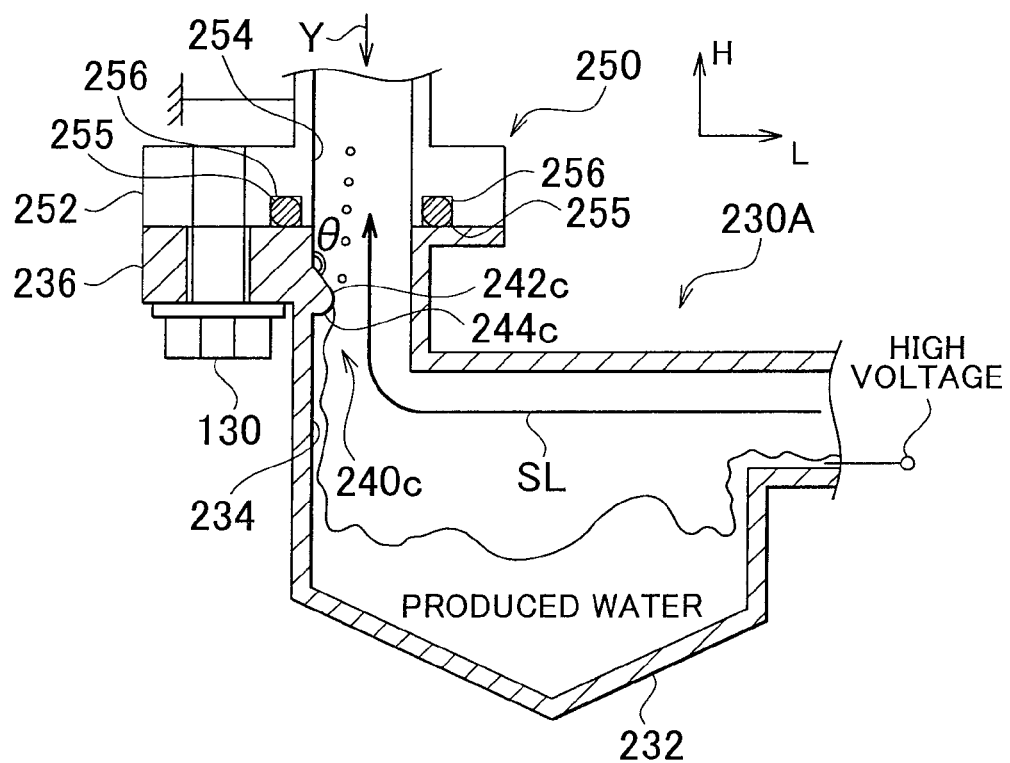
FIGS. 8A and 8B are views of a protruding portion according to a third modified example of the first example embodiment.
Figure 8B:
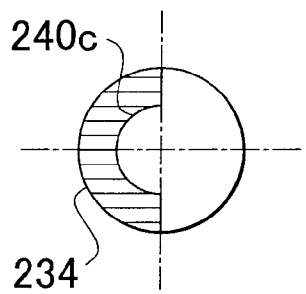

FIGS. 8A and 8B are views of a protruding portion 240c according to a third modified example of the first example embodiment. As shown in FIG. 8A, a wall surface portion 244c of the protruding portion 240c may be formed so as to continue on in a curved shape from an inclined portion 242c.

Figure 9A:
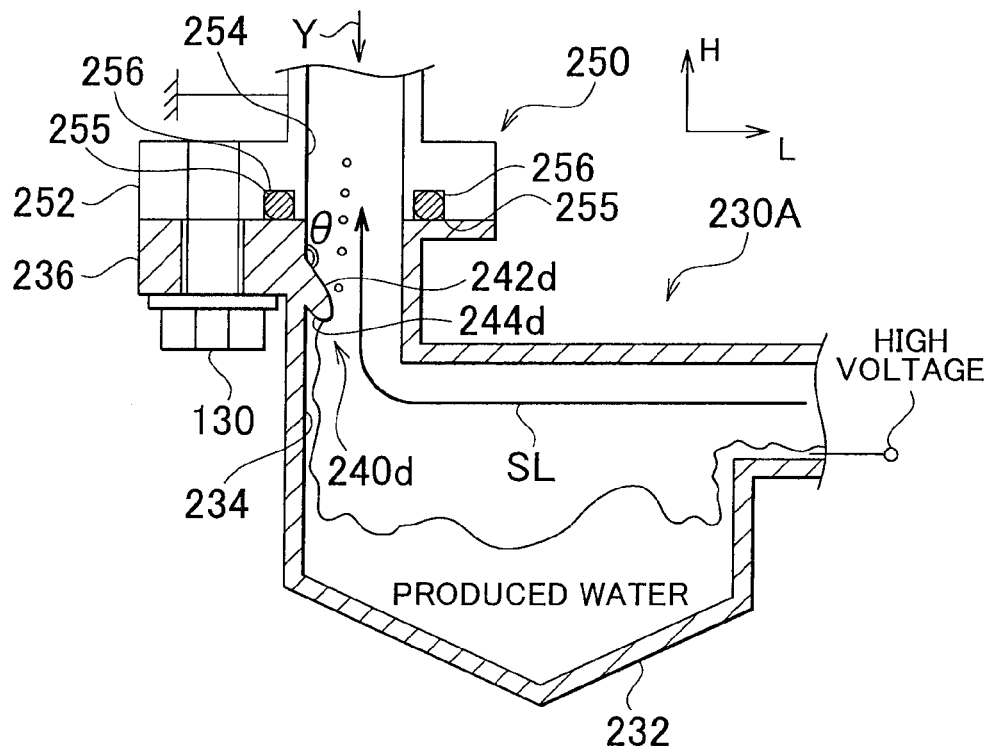
FIGS. 9A and 9B are views of a protruding portion according to a fourth modified example of the first example embodiment.
Figure 9B:
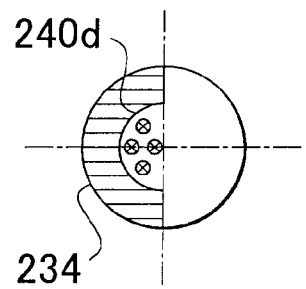

FIGS. 9A and 9B are views of a protruding portion 240d according to a fourth modified example of the first example embodiment. As shown in FIG. 9A, a wall surface portion 244d of the protruding portion 240d may be formed so as to continue on in a curved shape from an inclined portion 242d, and the angle formed between the wall surface portion 244d and the passage portion 234 may be an acute angle.

In this way, with the modified examples of the first example embodiment as well, just as in the first example embodiment, the flow of the produced water can be broken up or stopped, so an electrical short in the fuel cell stack 100 due to the produced water can be inhibited.

C2. Modified Examples of the Second Example Embodiment

Modified examples of the second example embodiment will now be described. The only difference between these modified examples and the second example embodiment shown in FIG. 5 is that the shape of the mesh member 310 arranged in the passageway of the passage portion 234 is different. Other than this, the structure is the same as it is in the second example embodiment.

Figure 10:
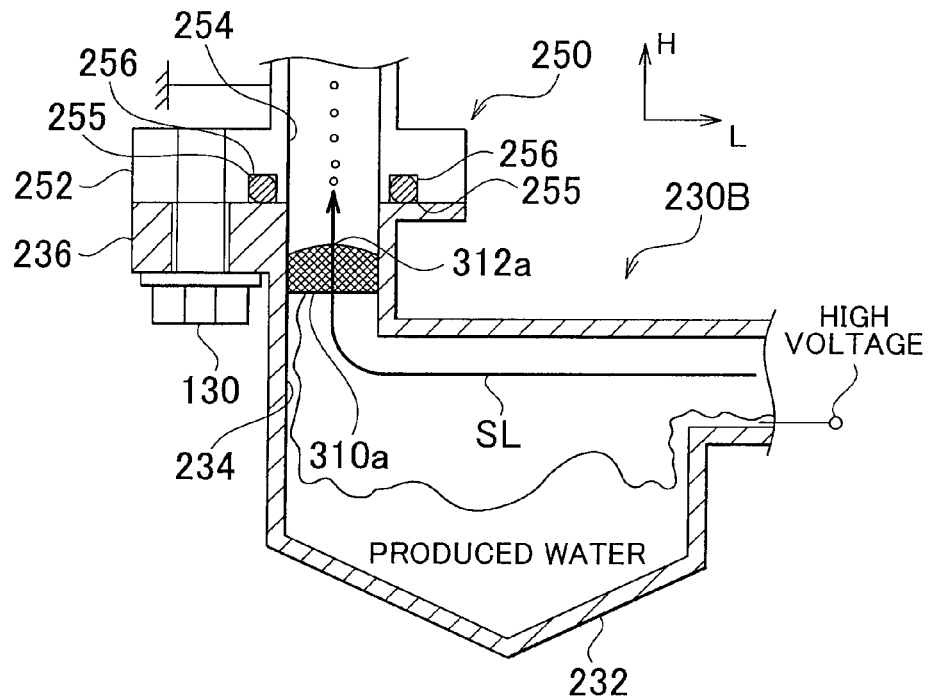
FIG. 10 is a view of a mesh member according to a first modified example of the second example embodiment.

FIG. 10 is a view of a mesh member 310a according to a first modified example of the second example embodiment. As shown in FIG. 10, a protruding portion 312a of the mesh member 310a may be formed in a spherical shape.

Figure 11:
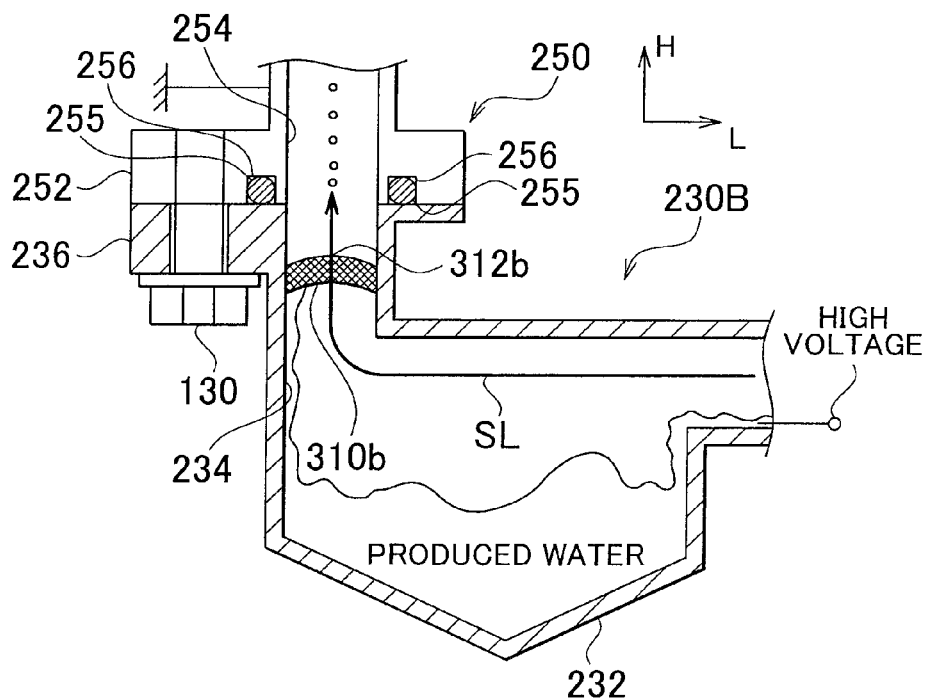
FIG. 11 is a view of a mesh member according to a second modified example of the second example embodiment.

FIG. 11 is a view of a mesh member 310b according to a second modified example of the second example embodiment. As shown in FIG. 11, the portion of a protruding portion 312b of the mesh member 310b that is on the upstream side in the flow direction SL (i.e., on the vertically lower side) may be formed in a spherical shape.

Figure 12:
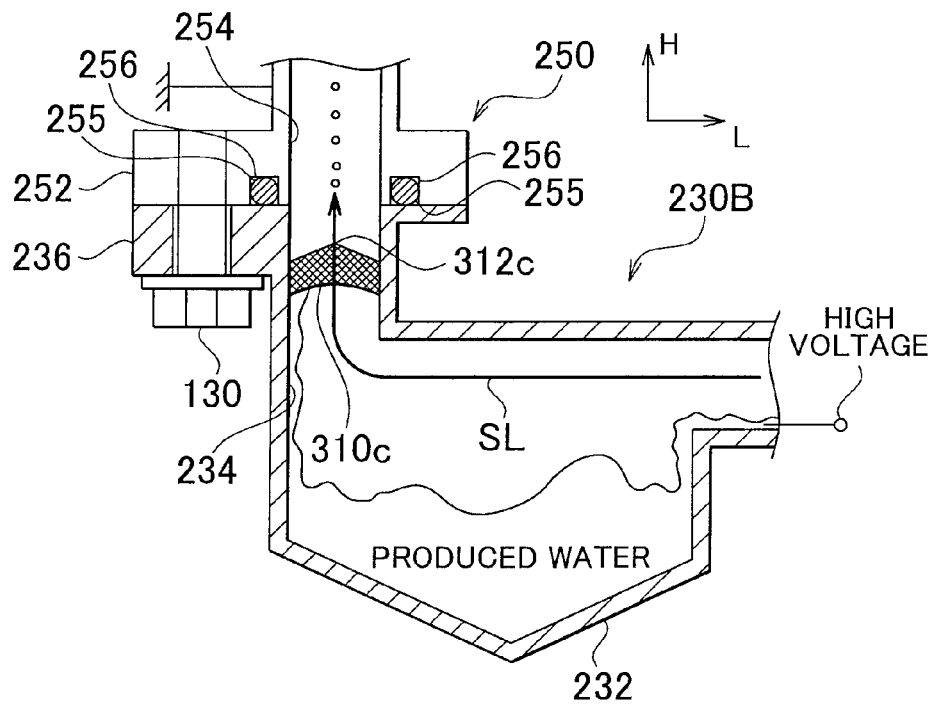
FIG. 12 is a view of a mesh member according to a third modified example of the second example embodiment.

FIG. 12 is a view of a mesh member 310c according to a third modified example of the second example embodiment. As shown in FIG. 12, a protruding portion 312c of a mesh member 310c may be formed in a conical shape, and the portion of the mesh member 310c that is on the upstream side in the flow direction SL (i.e., on the vertically lower side) may be formed in a spherical shape.

Figure 13:
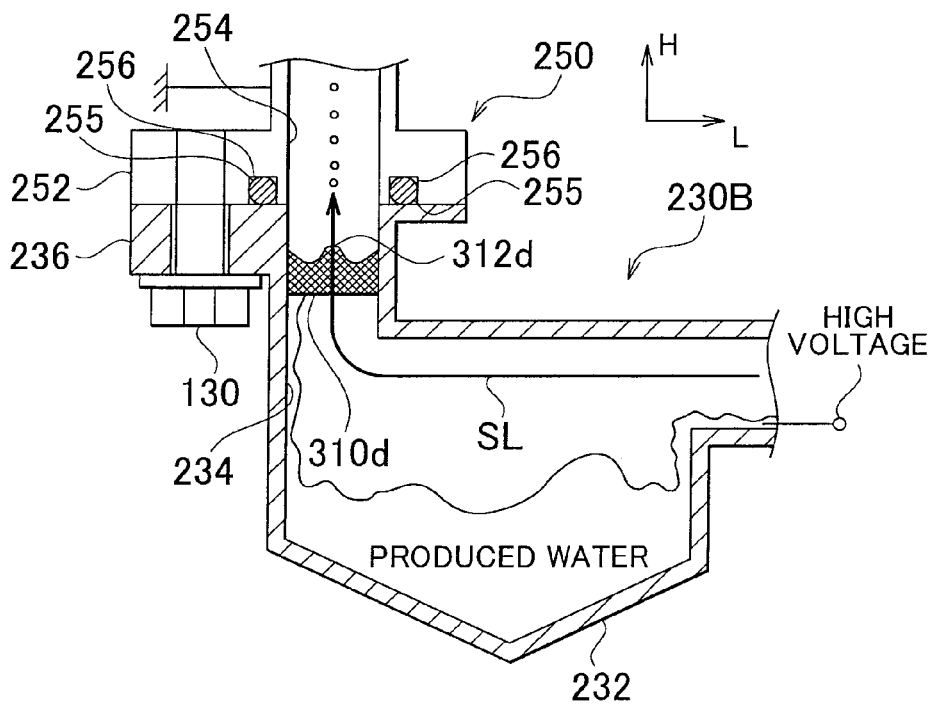
FIG. 13 is a view of a mesh member according to a fourth modified example of the second example embodiment.

FIG. 13 is a view of a mesh member 310d according to a fourth modified example of the second example embodiment. As shown in FIG. 13, the peripheral portion of a protruding portion 312d of the mesh member 310d may be formed in a shape that extends downstream in the flow direction SL (i.e., vertically upward) along the passage portion 234.

In this way, with the modified examples of the first example embodiment as well, just as in the second example embodiment, the flow of the produced water can be broken up or stopped, so an electrical short in the fuel cell stack 100 due to the produced water can be inhibited.

C3. Other Modified Examples

Figure 14A:
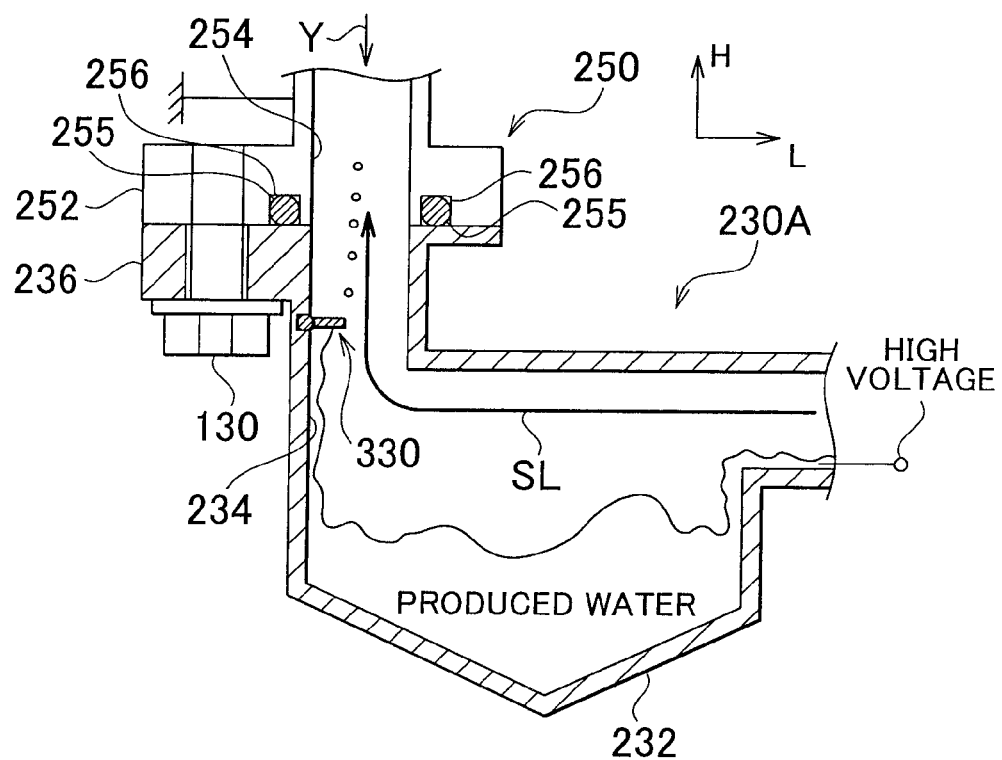
FIGS. 14A and 14B are views of another modified example.
Figure 14B:
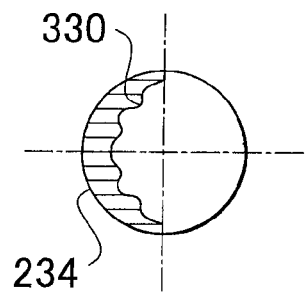

C3-1. FIGS. 14A and 14B are views of another modified example. In the first example embodiment described above, the protruding portion 240 is formed by deforming the inside wall of the passage portion 234 of the gas-liquid separating device 230. Instead, a separate member may be arranged in the passage portion 234 to form a shape that protrudes from the passage portion 234. In this modified example, a protruding member 330 is attached to the inside wall of the passage portion 234.

In this case as well, just as in the example embodiments described above, the flow of produced water can be broken up or stopped, so an electrical short in the fuel cell stack 100 due to the produced water can be inhibited. Incidentally, the tip end portion of the protruding member 330 is preferably formed in a pleated shape. This improves the ability of the protruding 330 to cut the water so the flow of the produced water can be effectively broken up or stopped.

C3-2. In the example embodiments and modified examples thereof described above, the location where the gas-liquid separating device 230 is connected to the hydrogen circulating pump 250 is described as an example. However, the invention may also be applied to an insulating first passage member through which produced water and off-gas pass, and a conductive second passage member that is connected to the first passage member in a fuel cell system. For example, the second passage member may also be a conductive passage member that is included in a pressure sensor that detects the pressure of off-gas or the like.

What is claimed is:

1. A fuel cell system comprising:
a fuel cell stack that generates electricity by an electrochemical reaction using a fuel gas and discharges water produced by the electrochemical reaction and hydrogen off-gas;
a gas-liquid separating device which separates the hydrogen off-gas from the produced water and includes an electrically insulating first passage member through which the produced water and the hydrogen off-gas pass;
an electrically conductive second passage member that is connected to the first passage member;
a produced water flow disrupting portion that is provided on a portion of the first passage member and breaks up or stops the flow of the produced water that is introduced from an inside wall of the first passage member to the second passage member, and
an exhaust passage member which connects the fuel cell stack and the gas-liquid separating device in which the hydrogen off-gas flows,
wherein the produced water flow disrupting portion is a protruding portion having a shape that protrudes from the inside wall of the first passage member,
wherein a section area of the portion of the first passage member on which the produced water flow disrupting portion is provided is smaller than a section area of a produced water storing portion of the gas-liquid separating device, which stores the produced water,
wherein a wall surface portion having a flat surface that is substantially perpendicular to a flow direction when the hydrogen off-gas flows from the first passage member toward the second passage member is formed on an upstream side, in the flow direction, of the protruding portion,
wherein an inclined surface portion that is gradually inclined to meet the inside wall of the first passage member is formed on a downstream side, in the flow direction when the hydrogen off-gas flows from the first passage member toward the second passage member, of the protruding portion, and an angle formed between the inclined surface portion and the inside wall exceeds 90°,
wherein the second passage member is a member that is included in a pump that draws up the hydrogen off-gas from the gas-liquid separating device, and
wherein a position of a lowest portion of the produced water flow disrupting portion is higher than a position of a highest portion of an inlet passage, which connects to the gas-liquid separating device, in the exhaust passage member.

2. The fuel cell system according to claim 1, wherein the protruding portion is provided on the inside wall of the first passage member at an outside portion of a curve that a flow follows when the off-gas flows from the first passage member toward the second passage member.

3. The fuel cell system according to claim 1, wherein the first passage member is a cylindrical member that extends substantially vertically from the produced water storage portion.

4. A fuel cell system comprising:
a fuel cell stack that generates electricity by an electrochemical reaction using a fuel gas and discharges water produced by the electrochemical reaction and hydrogen off-gas;
a gas-liquid separating device which separates the hydrogen off-gas from the produced water and includes an electrically insulating first passage member through which the produced water and the hydrogen pass;
an electrically conductive second passage member that is connected to the first passage member;
a produced water flow disrupting portion that is provided on a portion of the first passage member and breaks up or stops the flow of the produced water that is introduced from an inside wall of the first passage member to the second passage member, and
an exhaust passage member which connects the fuel cell stack and the gas-liquid separating device and in which the hydrogen off-gas flows,
wherein the produced water flow disrupting portion is a protruding portion having a shape that protrudes from the inside wall of the first passage member,
wherein a section area of the portion of the first passage member on which the produced water flow disrupting portion is provided is smaller than a section area of a produced water storing portion of the gas-liquid separating device, which stores the produced water,
wherein a wall surface portion that is gradually inclined to meet the inside wall of the first passage member is formed on an upstream side, in a flow direction when the hydrogen off-gas flows from the first passage member toward the second passage member, of the protruding portion, and an angle formed between the wall surface portion and the inside wall is less than 90°, wherein an inclined surface portion that is gradually inclined to meet the inside wall of the first passage member is formed on a downstream side, in the flow direction when the hydrogen off-gas flows from the first passage member toward the second passage member, of the protruding portion, and an angle formed between the inclined surface portion and the inside wall exceeds 90°, wherein the second passage member is a member that is included in a pump that draws up the hydrogen off-gas from the gas-liquid separating device, and wherein a position of a lowest portion of the produced water flow disrupting portion is higher than a position of a highest portion of an inlet passage, which connects to the gas-liquid separating device, in the exhaust passage member.

* * * * *